United States Patent [19]

Macall

[11] 4,081,678

[45] Mar. 28, 1978

[54] THROUGH-THE-LENS THERMOMETER APPARATUS

[76] Inventor: Thomas F. Macall, 1720 Witham Ave., Los Altos, Calif. 94022

[21] Appl. No.: 662,356

[22] Filed: Mar. 1, 1976

[51] Int. Cl.² .............................................. H01J 31/49
[52] U.S. Cl. .................................. 250/330; 73/355 R; 250/353
[58] Field of Search ............... 250/330, 333, 338, 340, 250/353; 73/355 R

[56] References Cited

U.S. PATENT DOCUMENTS

| | | | |
|---|---|---|---|
| 3,509,344 | 4/1970 | Bouwers | 250/333 |
| 3,581,089 | 5/1971 | Craig | 250/353 X |

Primary Examiner—Davis L. Willis
Attorney, Agent, or Firm—Michael L. Harrison

[57] ABSTRACT

Infra-red images are projected onto an infra-red detector whose output is amplified, linearized, digitized and displayed as a numerical value corresponding to the temperature of the object viewed by the infra-red optical system. The optical axis of the infra-red optical system is coaxial with the optical axis of a visible light optical system which is used for sighting and aligning the field of view of the infra-red optical system with the object. Through the eyepiece of the visible light optical system an observer sees the object, the scene area surrounding the object and the numerical value of the temperature of the object as indicated by a digital readout whose image is superimposed over the scene.

14 Claims, 2 Drawing Figures

THROUGH-THE-LENS THERMOMETER APPARATUS

BACKGROUND OF THE INVENTION

1. Field of the Invention

The present invention relates to temperature measuring devices, and more particularly to temperature measuring devices for remote temperature measurement by means of infra-red detectors used in cooperation with infra-red optical systems for focusing infra-red images, and visible light optical systems for alignment of the infra-red optical system with the desired object of measurement.

2. Prior Art

In the past, temperature measurement of moving, flowing, or remote objects has presented a difficult instrumentation problem which has not previously been satisfactorily resolved. Moving and inaccessible objects post a particularly vexing problem since attachment of measuring apparatus is not generally possible. Immersion in a fluid solves the problem for flowing substances at least at the point at which the sensor is immersed, but does not provide for measurement in differing locations.

For those situations in which it is possible to attach thermocouples, thermopiles, thermally sensitive resistors, semiconductor junctions, and similar devices, the problem is generally thought to have been satisfactorily solved. Even in many of these applications, however, the inconvenience of measuring temperature may be such that the effort is abandoned because it is not cost effective.

Attempts to make temperature measurement independent of contact with the object being measured led to the development of radiometric sensors which are sensitive to the infra-red radiation emanating from hot bodies. Apparatus dependent upon this principle has previously been devised for remote temperature measurements using optical systems to focus the infra-red energy on the detector for maximum sensitivity. Both hand-held portable apparatus and laboratory type instruments presently exist, as do air-borne and space-borne systems for terrain surveillance.

A common problem in hand-held instruments, and portable instruments which operate with varying spatial relationships between object to instrument, is the difficulty of accurate alignment of the detector with the exact area of interest. For aiming the device, simple mechanical sighting systems have been employed which suffice for many applications but suffer from the drawback that, in addition to being difficult to align and maintain in alignment, the observer does not know exactly how much of the object is being viewed by the detector or how much of it is contributing to the temperature indication. Generally, the observer must guess at this factor. Since it is more often than not desired to find temperature anomalies such as small "hot spots" or "cold spots", an instrument which views too large an area will not suffice. Bringing the instrument closer to the object either physically or optically will provide more sensitivity to small anomalies, but the observer still must guess how much of the scene is being viewed. Additionally, close-up use of the instrument generally brings a concomitant problem of parallax error so that the observer is led to conclude that an area other than the actual area of the anomaly is responsible for a hot or cold spot temperature.

Finally, sighting and reading of the instruments have in the past entailed two separate operations. While the observer views the object of interest through the instruments' sights, he must first align the instruments, then he must shift the focus of his eye from far to near and read the indication on the instruments' readout while holding the alignment previously established. For many users, the requisite steadiness is not attainable. As the field of view of the instrument is narrowed to increase the instruments' ability to resolve smaller areas, the problem becomes even more acute. Thus, a practical limitation on the useable resolution of hand-held instruments is quickly reached.

SUMMARY OF THE INVENTION

Accordingly, it is an object of the present invention to provide a temperature measuring apparatus which is capable of non-contacting measurement.

It is another object of the present invention to provide a temperature measuring apparatus which is easily aligned with the measurement object.

It is still another object of the present invention to provide a temperature measuring apparatus which can be easily maintained in alignment with the measurement object.

It is yet another object of the present invention to provide a temperature measuring apparatus which has a display superimposed over the scene containing the measurement object.

It is yet still another object of the present invention to provide a temperature measuring apparatus which indicates to the user the exact area within which the instrument is sensitive.

It is still another object of the present invention to provide a temperature measuring apparatus which may be employed both in close-up and distant temperature measurement without parallax error.

Briefly, the present invention accomplishes these and other objects by providing a hand-held, portable, or stationarily mounted through-the-lens temperature measuring apparatus which employs two coaxially mounted optical systems having preferably the same focal length, one adapted to use with infra-red, the other adapted to use with visible light. Infra-red energy is focused onto an infra-red detector whose output is amplified, linearized, digitized and displayed preferably in numerical form by a digital readout. The field of view of the infra-red optical system is preferably smaller than the field of view of the visible light optical system, and reticule lines are preferably superimposed over the view through the visible light system to facilitate alignment of the apparatus with the object of interest. The display is preferably superimposed on the view seen through the visible light optical system.

Coaxial mounting of the optical systems eliminates parallax error and enables simultaneous focusing of the two systems.

BRIEF DESCRIPTION OF THE DRAWINGS

The achievement of these and other objects by the present invention will become evident from consideration of the following detailed description and the accompanying drawings wherein.

DESCRIPTION OF THE PREFERRED EMBODIMENTS

General

Figure 1:
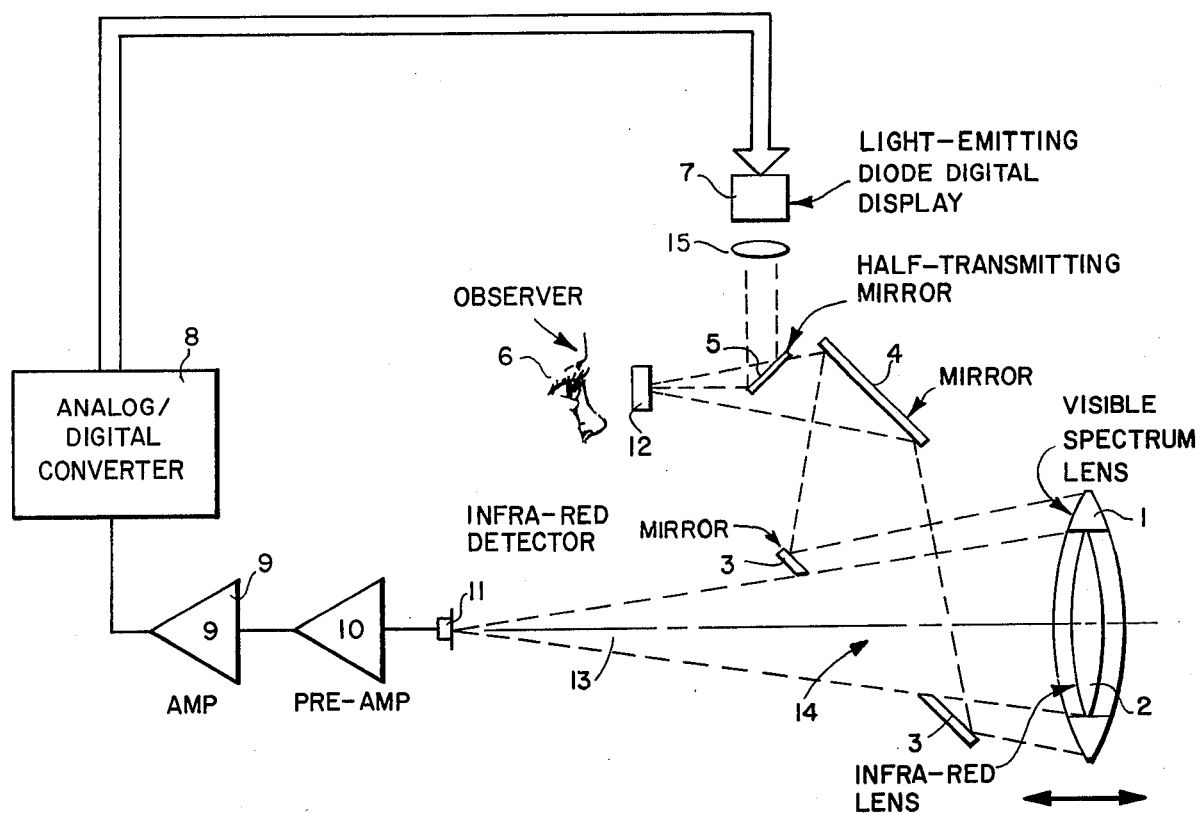
FIG. 1 is a simplified optical and electrical schematic diagram showing the infra-red and visible light optical systems, and the infra-red detection and readout circuits.

Referring now to FIG. 1, there is shown a simplified optical and electrical schematic diagram. Lens 1 is the objective lens of a visible light optical system. Lens 2 is the objective lens of an infra-red optical system. The lenses have common optical axes and similar, preferably identical, focal lengths.

Rays of infra-red pass through the aperture 14 of mirror 3 and are focused on detector 11. Visible light rays are deflected away from the optical axes by mirror 3, then re-directed parallel to the optical axes by mirror 4 and brought to focus at the location of the observer 6 by eyepiece 12.

By viewing an object through eyepiece 12, an observer can precisely direct the field of view of the infra-red lens 2 and detector 11 combination to any portion of the object of which it is desired to know the temperature. Infra-red radiation emanating from the object is focused upon the detector producing an output electrical analog corresponding to the total radiant power falling on the detector, which in turn corresponds to the temperature of the object. The signal, after amplification and linearization, is quantized and displayed as the numerical value of the temperature of the object.

Electrical signals produced at the output of infra-red detector 11 are amplified and linearized by preamplifier 10, and are amplified and offset, if required, by amplifier 9. The output of amplifier 9 is routed to an analog-to-digital converter 8. The digital word output produced by analog-to-digital converter 8 is routed to the elements of a light-emitting diode display 7. Images of the display are projected by lens 15 onto a half-transmitting mirror 5 which superimposes the image of the display over the view seen by observer 6.

INFRA-RED DETECTOR AND ASSOCIATED ELECTRONICS

Infra-red detector 11 is located at the focal point of lens 2 where it receives radiant energy collected from the object undergoing measurement. The detector 11 may be made of a variety of materials having suitable infra-red sensitivity characteristics. Lead sulphide, lead selenide and mercury-doped germanium are suitable, among many others. The preferred material will depend upon such factors as the temperature range required, the cost objectives, and whether it is desired to operate the detector in photo-conductive or photo-voltaic mode.

When infra-red radiation falls on the detector 11, an electrical current is produced which shows a rigorous dependence upon the total radiant power which is incident upon the detector. For "black bodies" or bodies whose radiation characteristics are sufficiently close to "black body" characteristics the relationship between total radiant power and the current produced is defined by a particular mathematical expression, specifically; Planck's Law.

The electrical current produced by detector 11 is weak and requires amplification before it may be put to useful work. Accordingly, the output of detector 11 is applied to a preamplifier 10 which provides an initial amount of low-noise amplification. If the detector characteristic is non-linear, i.e., its electrical output magnitude is not directly proportioned to the temperature of the "black body" against which it is calibrated, then linearization is required. Linearization is, generally speaking, best accomplished by logarithmic function generation within the pre-amplifier stage. Other alternatives include linearization of the analog signal at a high level stage by use of a multiple break-point diode function generator to provide a piecewise linear approximation of the required linearizing function, and, digitization of the analog signal followed by correction of the digital data using pre-established constants as provided, by, e.g., a read-only memory. Both of the latter alternatives are more expensive to implement than is the first. However, they may be preferred for some applications.

Since most detectors are highly subject to variation in characteristics with changes in ambient temperature, it is required that temperature compensation be provided if the instrument accuracy is not to suffer during exposure to ambient temperature extremes. Temperature compensation can also best be accomplished at the pre-amplifier stage by, e.g., operating the detector in a balanced bridge configuration in which one arm of the bridge contains a detector similar to detector 11, in thermal contact with detector 11, but shielded from infra-red radiation.

Following pre-amplifier 10, amplifier 9 provides still further gain to bring the analog signal to a useable level. At amplifier 9, it may be useful to provide offset compensation to remove any components of drift or voltage offset which may have been introduced in the detector, or during earlier stages of amplification.

OPTICAL SYSTEMS

The visible light optical system comprises objective lens 1, mirror 3, mirror 4 and eyepiece 12. The infra-red optical system comprises lens 2.

Lens 1 and lens 2 are coaxially mounted and preferably have identical focal lengths. Sharp focus is required of the visible light system to facilitate aiming, and is preferred for the infra-red system to maintain an accurate relationship between the actual field of view of the infra-red system and its indicated field of view as outlined on the reticule.

Lens 1 and lens 2 are depicted in FIG. 1 as being a composite lens, the center portion of which is adapted to use with infra-red wavelengths, while the outer portion is adapted to use with visible light wavelengths. The center lens is most advantageously made to accommodate the infra-red since it has a simpler geometry than does the partial outer lens 1. Since the infra-red lens 2 must be made from a limited class of materials all of which are either more brittle, more fragile, or more expensive than the usual optical materials, it is best to leave the difficult grinding and cutting operations for the visible light lens.

The infra-red lens 2 would ideally be fabricated from saphire, a material which has excellent infra-red characteristics and is extremely rugged. Unfortunately, it is also extremely expensive. A more economical approach is therefore advisable. One such approach, which combines saphire's ruggedness with the low-cost of other materials, is to manufacture the lens from an inexpensive material having desirable infra-red optical properties, such as calcium fluoride. A thin plate of saphire, much less expensively obtained than a saphire lens, can then be placed in front of the calcium fluoride lens to act as a barrier to mechanical and chemical damage.

Coaxial mounting of the lenses provides complete elimination of parallax error, regardless of the lens to object distance. Coaxial mounting also simplifies the focusing mechanism since, for lenses having identical focal lengths, focusing of outer lens 1 insures that lens 2 will also be exactly focused.

Visible light rays refracted by lens 1 impinge on mirror 3 and are reflected away from optical axis 13. Infra-red rays refracted by lens 2 pass through aperture 14 without deviation and focus on the infra-red detector 11 behind the mirror plane.

The size and shape of aperture 14 will depend upon the diameter of lens 2, the distance of mirror 3 from the lenses, and the angle of inclination of mirror 3 with respect to optical axis 13.

The diameter of lens 2, or more appropriately its aperture, or "f-stop" rating, will depend upon the desired sensitivity of the instrument, and the relative sensitivity required for the visible and infra-red sensitivities. A typical diameter for the infra-red lens is 6.5 cm, while the outer diameter of lens 1 is typically 10.5 cm. Wide variation of these diameters will be possible and desirable, however.

Mirrors 3 and 4 are preferably front reflecting types to avoid image ambiguities.

The aperture in mirror 3 is located at the optical axis 13 of both the visual and infra-red optical systems. To obtain maximum efficiency from the mirror and maximum sensitivity from the infra-red detector, it will be desirable to make the circumference of the aperture exactly large enough to pass all of the light rays refracted by the infra-red lens system, but no larger.

Mirror 5 is preferably a partially transmitting, partially-reflecting type located between the objective lens 1 and the eyepiece 12 of the visible light optical system. Images of the display projected onto the mirror 5 will therefore be visible to the observer 6. However, since the mirror is partially-transmitting, the details of the scene under observation will still be visible, albeit somewhat less bright than the areas not behind the mirror.

Figure 2:
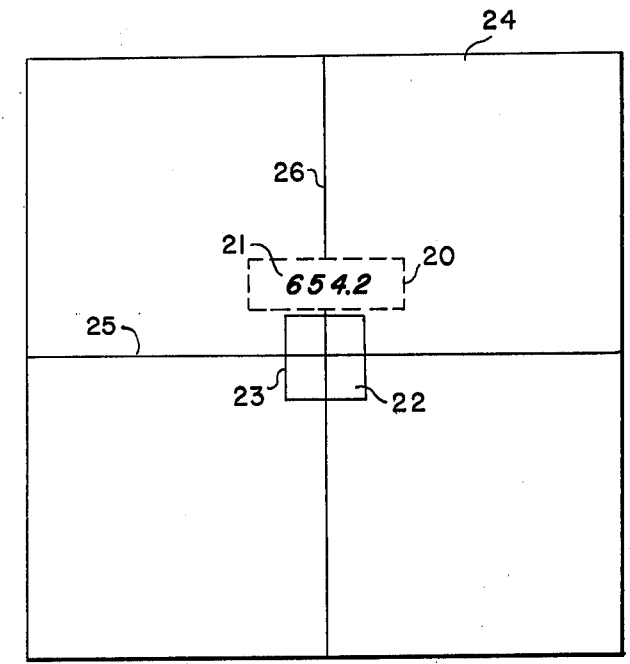
FIG. 2 is a simplified depiction of the view seen by a user of the present invention through the eyepiece.

Through the eyepiece, the observer 6 sees a scene superimposed with cross-hairs 25 and 26 and reticle line 23. Slightly above area 22 surrounded by reticle line 23 is the partially-transmitting mirror 5, represented by the dotted line outline 20. The image shown in FIG. 2 is illustrative of a digital readout display having four digit resolution. Other types of displays, for example, an analog meter movement, could also be employed and its image projected onto mirror 5. It would perhaps be desirable to do so in some cases, but for precise measurement work, a digital indicator is definitely preferred.

Because light-emitting diode arrays are self-illuminating, small in size, compatible with many digital logic families and, recently, have become competitive in price with other digital types, they are ideal for use in the present invention. FIG. 1 depicts the digital display 7 as being formed of light-emitting diodes with lens 15 being employed to project their images onto the half-transmitting mirror 5.

OPERATION

The use of the Through-the-Lens Thermometer Apparatus may be illustrated by reference to FIGS. 1 and 2.

In FIG. 1, the position of the observer 6 is shown viewing the image formed by the lens 1 and eyepiece 12. The view through the eyepiece is preferably bounded by frame 24 of FIG. 2. The portion of the field of view which corresponds to the field of view of the infra-red detector is indicated by square 23 and is preferably outlined by reticle lines in the eyepiece 12. Horizontal cross-hair 25 and vertical cross-hair 26 are also preferably included in the eyepiece 12 to facilitate exact alignment of the infra-red sensitive area 23 with the area of which it is desired to know the temperature.

If it is desired to measure the temperature of a hot object, for example, the temperature of molten steel in a pouring ladle, an observer views the ladle through eyepiece 12 and visible light lens 1. Since the field of view of the visible light system is large, reference points are easily seen and the subject area is easily located. However, since it is desired to measure only the temperature of the molten steel itself and not the average temperature of the steel, the ladle and the surrounding areas, the field of view of the infra-red sensitive detector 11 is preferably limited to a small percentage of the total area viewed. The observer endeavors to superimpose area 22 over the molten steel only, thereby excluding from the measurement extraneous object and background temperatures.

When the area of mesurement is not easily distinguished visually from its background, the wide field of view of the visual light system and the cross-hairs 25 and 26 assist in establishing and maintaining the desired alignment of the infra-red sensitive are 22 with the area of measurement.

The superimposed image of the digital display is preferably located near area 22 to minimize the distraction of the user when it is desired to note the temperature indication thereby eliminating one of the more serious limitations on hand-held instrumentation.

While a preferred embodiment of the present invention has been described, it will be apparent to those skilled in the art that variations of the preferred embodiment may be practiced without departure being made from the general principles taught in the specification and claimed below in the claims.

What is claimed is:

1. An apparatus for measuring the temperature of objects, comprising:
   a. an infra-red lens for focusing infra-red rays;
   b. a visible light optical system having an optical axis common to the optical axis of the infra-red lens for focusing visible light;
   c. an infra-red detector located proximate the focal point of the infra-red lens, having an output;
   d. an amplifier responsive to the output of the infra-red detector;
   e. a display responsive to the amplifier output for displaying the magnitude of the amplifier output.

2. The apparatus of claim 1 wherein the display is digital.

3. The apparatus of claim 2 wherein the visible light optical system includes an objective lens and an eyepiece.

4. The apparatus of claim 3 wherein the eyepiece includes cross-hairs for assistance in aiming.

5. The apparatus of claim 4 wherein the eyepiece includes an outline of the field of view of the infra-red lens and detector combination 6. The apparatus of claim 3 wherein the optical system includes a partially-transmitting mirror interposed between the objective lens and the eyepiece.

7. The apparatus of claim 6 wherein the digital display is located adjacent to the partially-transmitting mirror such that an image of the display is visible through the eyepiece.

8. The apparatus of claim 3 wherein the infra-red lens and the objective lens of the visible light optical system are composite.

9. The apparatus of claim 3 wherein the objective lens of the visible light optical system and the infra-red lens have the same focal lengths.

10. The apparatus of claim 3 wherein the objective lens of the visible light optical system and the infra-red lens are focused simultaneously.

11. The apparatus of claim 3 wherein a mirror is located betwen the objective lens and the eyepiece for diverting the light rays away from the optical axis.

12. The apparatus of claim 11 wherein a second mirror is located between the mirror and the eyepiece.

13. The apparatus of claim 11 wherein the mirror contains an aperture for allowing infra-red rays to pass through the plane of the mirror.

14. The apparatus of claim 1 wherein the display is an analog meter movement.

* * * * *